United States Patent [19]

Bradshaw et al.

[11] Patent Number: 4,766,662

[45] Date of Patent: Aug. 30, 1988

[54] METHOD OF PROTECTING HOSE WITH A PLASTIC ABRASION-RESISTANT PROTECTIVE SLEEVE

[75] Inventors: Johnny S. Bradshaw; Jonas L. Gunter; Liggett A. Cothran, all of Haywood; William M. Edwards, Waynesville; Pearison W. Henry, Jackson, all of N.C.

[73] Assignee: Dayco Products, Inc., Dayton, Ohio

[21] Appl. No.: 941,494

[22] Filed: Dec. 16, 1986

Related U.S. Application Data

[63] Continuation of Ser. No. 641,081, Aug. 15, 1984, abandoned.

[51] Int. Cl.$^4$ .................................................. B23P 11/02
[52] U.S. Cl. .................................... 29/450; 29/453; 29/455.1; 138/151; 138/156
[58] Field of Search ............... 29/450, 453, 455 R; 138/151, 149, 156, 121, 128; 53/396

[56] References Cited

U.S. PATENT DOCUMENTS

| | | | |
|---|---|---|---|
| 1,435,311 | 11/1922 | Knight | 29/450 UX |
| 1,977,775 | 11/1932 | Patterson. | |
| 1,993,965 | 3/1935 | Huck et al. | 29/450 UX |
| 3,060,069 | 10/1962 | Sindars | 29/450 UX |
| 3,490,496 | 1/1968 | Stearns. | |
| 4,054,985 | 10/1977 | Aleniusson. | |
| 4,160,466 | 7/1979 | Jousson. | |
| 4,214,147 | 7/1980 | Kraver | 29/450 UX |
| 4,218,814 | 8/1980 | Hodapp | 29/450 |
| 4,261,671 | 4/1981 | Langner. | |
| 4,463,780 | 8/1984 | Schultz et al. | 138/156 X |

FOREIGN PATENT DOCUMENTS 1327659 8/1973 United Kingdom.

Primary Examiner—Charlie T. Moon
Attorney, Agent, or Firm—Joseph V. Tassone

[57] ABSTRACT

The present invention relates to a plastic abrasion resistant protective sleeve for covering a radiator hose. The sleeve of the invention has a corrugated external surface comprising a plurality of projections and troughs formed in said sleeve. The projections are substantially evenly distributed and have a substantially uniform size. The sleeve has a slit along its longitudinal axis which provides for easy application to or removal from the hose, and is made of plastic that is substantially unaffected by high temperatures. A method of using said protective sleeve for protecting a radiator hose from abrasion also is provided.

5 Claims, 1 Drawing Sheet

METHOD OF PROTECTING HOSE WITH A PLASTIC ABRASION-RESISTANT PROTECTIVE SLEEVE

This is a continuation of application Ser. No. 641,081 filed Aug. 15, 1984, now abandoned.

BACKGROUND OF THE INVENTION

1. Field of the Invention

The present invention relates to a plastic abrasion-resistant sleeve for protecting hose and a method for protecting hose.

2. Prior Art Statement

Because of fluctuations in the supply of energy, automobiles have been made increasingly more compact. Due to the downsizing of engine compartments, many underhood components are located in close proximity to the radiator hose. To prevent wear on such radiator hose due to contact with underhood components, an integral abrasion-resistant EPDM (ethylene-propylene-diene-monomer) rubber oversleeve has been used in some prior applications to protect the radiator hose. In such prior applications, the protective rubber oversleeve is disposed around the radiator hose during construction of such hose. However, the disposal of such rubber oversleeve is labor intensive and increases the chance that the hose will be scrapped since gases are sometimes trapped between the hose and the oversleeve. Trapped gases expand during vulcanization and sometimes cause delamination of the hose.

Also, since the water carried by the radiator hose, under running conditions, becomes very hot, and rubber loses abrasion resistant properties when subjected to heat over a period of time, the abrasion resistance of the EPDM abrasion resistant sleeve diminishes with age.

It is known in the art to provide a helical rubber protector for a hose as is illustrated by Patterson in U.S. Pat. No. 1,977,775.

It is known in the art to provide a protective cover for an insulated pipe bend comprising a corrugated band material, which is formed on the pipe bend and which is cut lengthwise into two or more parts as illustrated by Aleniusson in U.S. Pat. No. 4,054,985.

It is known in the art to provide an abrasion resistant flexible hose which employs a number of rubber bumpers distributed on the hose, as illustrated by Brunelle et al in U.K. Pat. No. 1,327,659.

It is known in the art to provide a plastic conduit having a slit therein for protecting electrical wires in an automobile.

It is also known in the art to provide a plastic protective sleeve, having a slit, over hose carrying ambient temperature fluid on an automobile engine.

Langner, in U.S. Pat. No. 4,261,671 illustrates a corrugated pipe having an internal liner which is used for deep water applications.

Corrugated pipe used for other applications are also illustrated by U.S. Pat. Nos. 3,490,496, Stearns and 4,160,466, Jousson.

SUMMARY OF THE INVENTION

In accordance with the present invention there is provided an abrasion-resistant protective sleeve for covering a radiator hose. The sleeve of the invention has a corrugated external surface comprising a plurality of projections integrally formed in said sleeve. The projections of the sleeve are substantially evenly distributed, are substantially the same size, are substantially stationary relative to one another, yet provide flexibility in the sleeve. The corrugated sleeve is slit along its longitudinal axis to provide easy application to and removal from the hose. In its preferred embodiment, the corrugated sleeve is made of a plastic that is substantially unaffected by high temperatures.

Further, in accordance with the present invention, an improved method of protecting a hose from abrasion is provided in which an abrasion resistant protective sleeve is applied to a hose. The improvement in the method comprises the steps of providing a corrugated plastic sleeve having a slit along its longitudinal axis, making said plastic sleeve using a plastic that is substantially unaffected by high temperatures, bending the plastic sleeve to the shape of the hose, spreading the plastic sleeve at the slit along its longitudinal axis, and slipping the protective sleeve over the hose by moving the hose through said slit.

It is an object of the present invention to provide an improved method of protecting rubber hose subject to high temperatures against abrasion.

It is another object of the present invention to provide an improved protective sleeve for protecting rubber hose.

Other aspects, embodiments, objects, and advantages of this invention will become apparent from the following specification, claims and drawings.

BRIEF DESCRIPTION OF THE DRAWINGS

The accompanying drawings show present preferred embodiments of this invention, in which.

DETAILED DESCRIPTION OF THE PREFERRED EMBODIMENTS

Figure 1:
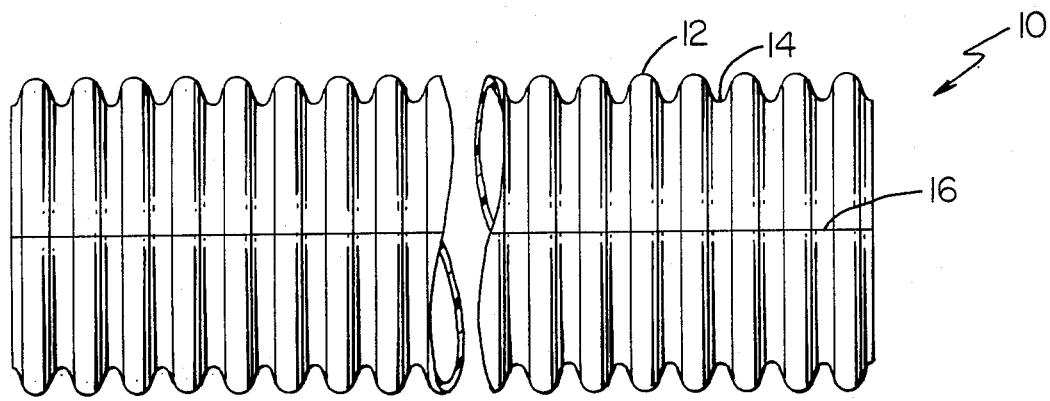
FIG. 1 illustrates a section of an abrasion-resistant protective sleeve.

Reference is now made to FIG. 1 of the drawings which illustrates a protective sleeve of the present invention which is designated generally by the reference numeral 10. The projections 12 and troughs 14 define the corrugated structure of the protective sleeve. The slit 16 traverses the length of the protective sleeve and is aligned with the longitudinal axis of the sleeve. The inside diameter 18 may be varied depending on the size of the hose that is to be protected.

Figure 2:
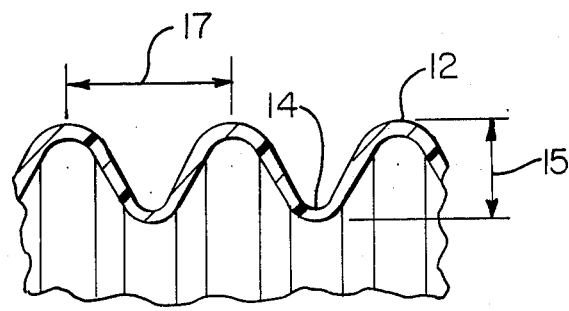
FIG. 2 illustrates a close up view of a portion of the protective sleeve illustrating some dimensions of the preferred embodiments.

Referring now to FIG. 2, in the preferred embodiment, the height of the projections, defined as the distance between projection 12 and trough 14, as represented by arrow 15, will generally be about 0.2 inch. The distance between projections 12 is represented by arrow 17, and generally will be about 0.35 inch.

The corrugations of protective sleeve 10 provide flexibility which makes it possible to bend sleeve 10 to nearly any desired shape. Because sleeve 10 is flexible, and because of the presence of slit 16 in sleeve 10, it is possible to install the protective sleeve 10 on a hose just prior to packaging. (See FIG. 4). Also, the protective sleeve 10 can be removed or repositioned if necessary. Thus, since the protective sleeve of the present invention is adapted to be placed on a curved hose after the hose has been completely constructed, the problem encountered by the EPDM rubber oversleeve used previously to protect radiator hoses, namely the trapping of gases between the rubber oversleeves and the hose prior to vulcanization, is avoided.

It has been found that plastic compounds have abrasion properties superior to EPDM rubber. Also, plastic is much lighter than EPDM rubber. For example, a typical EPDM rubber sleeve was found to have a weight of 0.21256 lb. A plastic sleeve of the same size was found to have a weight of 0.04295 lb. Thus, a plastic sleeve of the present invention has about 1/5 the weight of EPDM rubber oversleeves used previously. Any plastic that is substantially unaffected by high temperatures and is suitable for forming a plastic hose may be used in the invention. In its preferred embodiment, the plastic materials used for making the protective sleeve will be selected from polypropylene and polyester and copolymers thereof.

The body of the sleeve of the invention can be made by conventional means known in the art of making plastic hose.

Although it will be apparent to those skilled in the art that the protective sleeve can be made in any desired dimension, in its preferred embodiment for the protection of radiator hose, the corrugations will have a depth of about ⅔ the pitch of said corrugations and about 1/10 the outside diameter of said sleeve. The inside diameter (I.D.) of the sleeve will be about 1.6 inches and the outside diameter (O.D.) will be about 2 inches.

Figure 3:
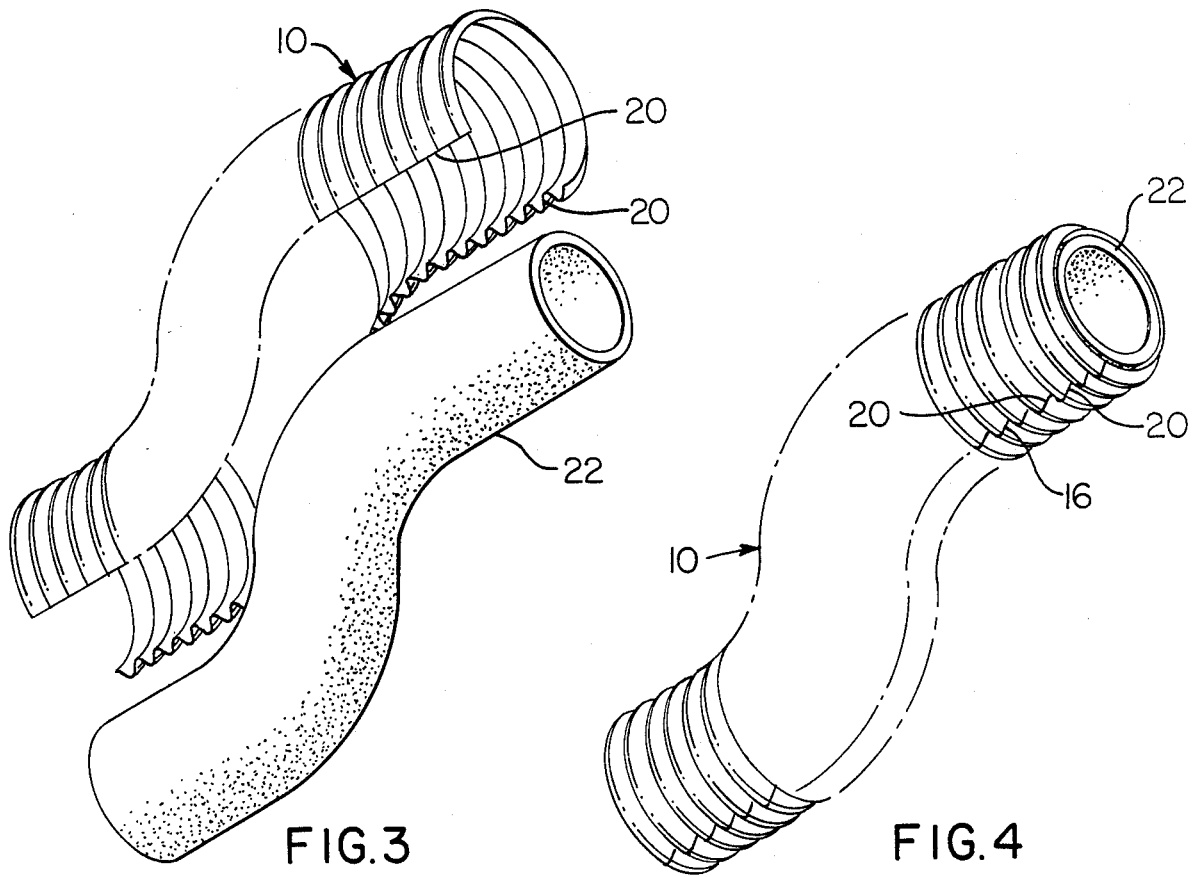
FIG. 3 illustrates a protective sleeve which has been bent to the shape of a hose, and spread to a position where it can be slipped over a hose.
Figure 4:
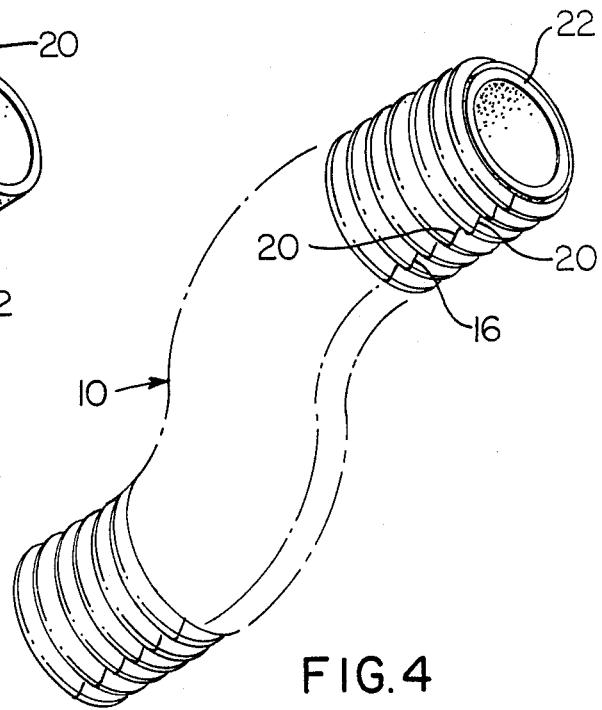
FIG. 4 illustrates a hose having a protective sleeve thereover.

Referring now to FIGS. 3 and 4, which illustrate the method of the present invention, in which hose 22 is protected from abrasion when a protective sleeve 10, made as described above, is placed over a completed hose prior to packaging. Because of the flexibility provided by the corrugations, protective sleeve 10 may be bent to the shape of the hose which is to be protected, and because of slit 16, the ends 20 of protective sleeve 10 may be spread apart so that ends 20, which define the edges of slit 16, fit over hose 22. Although natural resiliency to a large extent causes the ends 20 of the plastic sleeve 10 to close after sleeve 10 has been applied, after sleeve 10 has been positioned as desired on hose 22, pressure may be applied to sleeve 10 in order to close the gap further between ends 20 such that sleeve 10 fits snugly on hose 22. Because of the flexibility and resiliency of the plastic materials used to make sleeve 10, if at a later time it is desired to reposition sleeve 10 on hose 22, the same procedure can be used. Also, in the event that sleeve 10 needs to be replaced, the above described procedure can be used to remove an old sleeve 10 and replace it with a new sleeve 10 without removing hose 22 from its position in the apparatus. Thus, sleeve 10 can be positioned as needed on a hose without disassembling the apparatus in which the hose is used.

The following example illustrates the superior properties of plastic that is substantially unaffected by high temperatures for its use in protecting rubber products against abrasion.

EXAMPLE

Additional advantages of the plastic protective sleeve of the present invention over the prior art EPDM protective sleeve are illustrated by the following data comparing the abrasion resistance of EPDM rubber and polypropylene.

|  | Compound XD2695 (Polypropylene) | | Compound AB6013 (EPDM) | |
| --- | --- | --- | --- | --- |
|  |  | * |  | * |
| Tensile strength (psi) | 2324 | 2448 | 1246 | 1452 |
| Elongation (%) | 217 | 193 | 425 | 300 |
| Tear Die C (#/in) | 891 | 867 | 174 | 187 |
| Abrasion (mg loss) Tabor #18 wheel 1000 gms/1000 cycles | 109 | 118 | 324 | 1566 |
| Durometer (Shore A) | 95 | 95 | 67 | 78 |
| Wt. Loss | — | 0.2% | — | 5.15% |

*Denotes the properties of the material after being held at a temperature of 260° F. for 7 days. (aging test)

The tensile strength, elongation, tear resistance and abrasion resistance are indicative of the expected wear properties of the protective sleeve. The data of this example illustrates that the tensile strength, tear resistance and abrasion resistance of polypropylene is much greater than the corresponding properties in EPDM rubber. Thus, the wear resistance of polypropylene as compared to EPDM rubber, particularly as measured by the abrasion loss, would be expected to be correspondingly greater.

The Durometer measurement measures the hardness of the two materials. The Durometer reading illustrates that polypropylene is harder than EPDM rubber.

More importantly, as shown by the results of the aging test (exposure to heat and air), the properties of polypropylene are less subject to change with time. Thus, where EPDM rubber is subject to a considerable change in abrasion resistance with age, (1566 mg loss as compared to 324 mg loss), the abrasion resistance of polypropylene is relatively constant (118 mg loss as compared to 109 mg loss).

While present exemplary embodiments of this invention, and methods of practicing the same have been illustrated and described, it will be recognized that this invention may be otherwise variously embodied and practiced within the scope of the following claims.

We claim:

1. In a method of making and packaging a length of vehicle radiator hose that has been protected from abrasion by the attaching of a protective sleeve to said hose, the improvement comprising the steps of forming a corrugated abrasion resistant protective sleeve with a slit along its longitudinal axis and of a plastic material that is substantially unaffected by high temperature and that has a relatively constant abrasion resistance during aging, forming a length of radiator hose with curve means between the ends thereof, bending said protective sleeve to the curved shape of said length of hose, then spreading the edges of said slit of said protective sleeve, then applying said sleeve around said length of hose, then closing said edges toward each other to cause said sleeve to fit snugly over said length of said hose, and then packaging the thus sleeve covered length of hose.

2. A method according to claim 1 which further comprises the step of forming said plastic abrasion-resistant sleeve corrugations having a depth of about ⅔ the pitch of said corrugations.

3. A method according to claim 1 which further comprises the step of forming said plastic abrasion-resistant sleeve from polypropylene or copolymers thereof.

4. A method according to claim 1 which further comprises the step of forming said plastic abrasion-resistant sleeve from polyester or copolymers thereof.

5. A method according to claim 1 which further comprises the step of forming said sleeve of a material having a Tabor #18 wheel abrasion resistance with a loss of 109 mg per 1000 gms/1000 cycles before aging, and a loss of 118 mg after aging for seven days at a temperature of 260 degrees F.

* * * * *